United States Patent Office 3,441,590
Patented Apr. 29, 1969

3,441,590
PROCESS FOR PREPARING S-(2-CHLOROETHYL) THIOCARBAMATES FROM S-(2-CHLOROETHYL) ISOTHIOCARBAMYL CHLORIDES
Gerhard F. Ottmann, Hamden, and Haywood Hooks, Jr., West Haven, Conn., assignors to Olin Mathieson Chemical Corporation, New Haven, Conn., a corporation of Virginia
No Drawing. Filed Aug. 10, 1965, Ser. No. 478,762
Int. Cl. C07c *155/02;* C07d *91/14;* A01n *9/12*
U.S. Cl. 260—455           4 Claims

ABSTRACT OF THE DISCLOSURE

S-(2-chloroethyl)thiocarbamates of the formula

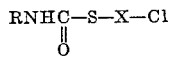

wherein R is an alkyl, cycloalkyl, aralkyl, aryl or substituted aryl group and X is an alkylene, substituted alkylene or cycloalkylene group, are provided in high yield and purity by the reaction of the corresponding S-(2-chloroethyl)isothiocarbamyl chlorides with water. The S-(2-chloroethyl)thiocarbamates are useful agricultural chemicals.

This invention relates to a series of S-(2-chloroethyl) thiocarbamates having the following general formula:

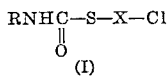

wherein R is an alkyl, cycloalkyl, aralkyl, aryl or substituted aryl group; X is an alkylene, substituted alkylene or cycloalkylene group; and wherein the chlorine atom attached to the group represented by X is separated from the sulfur atom by two methylene moieties. These compounds are valuable agricultural chemicals, and they are also useful chemical intermediates since the secondary amino group is particularly susceptible to further organic reactions.

The thiocarbamates I are provided in high yield and purity by the reaction of the corresponding S-(2-chloroethyl)isothiocarbamyl chlorides II with water in accordance with the following equation:

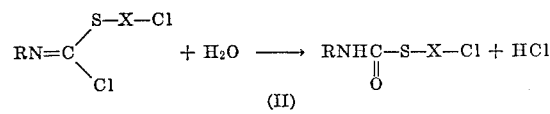

The S-(2-chloroethyl)isothiocarbamyl chlorides used as starting reactants in this invention are provided by the reaction of S-chloro-isothiocarbamyl chlorides with a variety of unsaturated hydrocarbons. The S-chloro-isothiocarbamyl chlorides are provided by the reaction of various isothiocyanates and diisothiocyanates with a substantially equivalent amount of chlorine at low reaction temperatures in the presence of an inert solvent. A complete and general description of the preparation of the chlorides II is disclosed in our copending U.S. Patent Application, Ser. No. 390,184, filed Aug. 17, 1964 now U.S. Patent 3,356,726.

While a wide variety of S-(2-chloroethyl)isothiocarbamyl chlorides having the formula RNC(Cl(SXCl), wherein R is as previously defined, may be used as starting reactants in the practice of this invention, it is preferred to utilize certain of these derivatives. Thus, preferred chlorides II used in the practice of this invention are those derivatives wherein R is alkyl having 1-18 carbon atoms, cyclohexyl, aryl having 6-8 carbon atoms such as phenyl, tolyl and xylyl, phenyl having a lower alkoxy (1-3 carbon atoms) substituent, halogenated phenyl and nitrated phenyl.

Likewise included among the chlorides II which are especially preferred starting reactants in the preparation of the thiocarbamates I are those derivatives wherein X represents alkylene having 2-18 carbon atoms, cycloalkylene having 5-12 carbon atoms and alkylene having 2-3 carbon atoms and being substituted by chlorine, bromine, phenyl, chlorophenyl, methoxyphenyl, and a lower alkoxy group. The preparation of these preferred S-(2-chloroethyl)isothiocarbamyl chlorides and others is disclosed in detail in the aforementioned copending U.S. patent application now U.S. Patent 3,356,726.

The process of this invention comprises contacting the chlorides II with water at a temperature range of 0° C. to 100° C. and isolating the resulting thiocarbamates I. It is a surprising and unexpected feature of this invention that selective hydrolysis only of the chlorine atom attached to the double bonded carbon atom occurs thus providing an efficient process for thiocarbamate preparation in high yield and purity. No other hydrolysis byproducts are obtained, and separation problems are obviated. Thus the chlorine atom attached to the alkylene moiety (X in the Formula I) is not hydrolyzed while preparing the thiocarbamates in accordance with the process disclosed herein. Furthermore, it is a surprising feature of this invention that no hydrolysis occurs to provide free amine (i.e., aniline when R is phenyl) even when thiocarbamate preparation is carried out in refluxing aqueous medium containing evolved hydrogen chloride.

Isolation of the thiocarbamates is conveniently achieved by decanting or separating the acidic aqueous medium from the organic material. It is advantageous to wash the products with water to remove acidic traces prior to drying the products. The solid thiocarbamates are conveniently purified by recrystallization from appropriate organic solvents such as methanol, hexane, and the like. Alternatively, the isolation can be performed by extracting the organic material from the reaction mixture by the use of ether, followed by washing and evaporation procedures.

As mentioned in the foregoing discussion, the thiocarbamates I are useful agricultural chemicals and have demonstrated utility as nematocides and as herbicides. They are particularly useful soil fungicides. When fungicidal compositions containing these derivatives as the active ingredients are applied to the soil area surrounding cotton plants, the fungi *Rhizoctonia solani* and *Pythium ultimum*, which are pathogenic to cotton plants, are effectively controlled.

The thiocarbamates I, all of which contain a reactive secondary amino group, are also useful organic intermediates. For instance, they react with bases in general to provide a series of useful heterocyclic derivatives. Thus they react with alkali metal hydroxides and alkoxides (i.e., NaOH, NaOCH₃) in a reaction medium such as water or alcohol or with organic bases (i.e., tertiary amines such as triethyl amine) in an inert organic solvent to provide the corresponding cyclic thiazolidinones which have demonstrated biological activity in agricultural applications.

The following examples will serve to illustrate the preparation of several of the thiocarbamates I in accordance with the process disclosed herein.

Example 1

An amount of 16.0 g. of N-phenyl S-(2-chloroethyl) isothiocarbamyl chloride was added portionwise and with stirring to 150 ml. of water. When the exothermic reaction had ceased, the reaction mixture was kept at 50°–75°

C. for 15 minutes and then cooled to 0° C. The acidic water layer was decanted and the remaining waxy solid washed with water until neutrality. The solid afforded upon two recrystallizations from hexane 11.3 g. (68% yield) of N-phenyl S-(2-chloroethyl)thiocarbamate in the form of white needles, M.P. 88°–89° C.

*Analysis.*—Percent calcd. for $C_9H_{10}ClNOS$: C, 50.12; H, 4.67; Cl, 16.46; N, 6.50; S, 14.84. Found: C, 50.18; H, 4.63; Cl, 16.70; N, 6.87; S, 15.18.

Example 2

Amounts of 26.0 g. of N-phenyl S-(2-chlorocyclohexyl) isothiocarbamyl chloride and 130 ml. of hot water were reacted as described in Example 1. Recrystallization of the crude reaction product from 60 ml. of methanol gave 20.1 g. (82.5% yield) of pure N-phenyl S-(2-chlorocyclohexyl)thiocarbamate, M.P. 114°–115° C., in the form of white prisms.

*Analysis.*—Percent calcd. for $C_{13}H_{16}ClNOS$: C, 57.88; H, 5.98; N, 5.20; S, 11.86. Found: C, 57.96; H, 5.85; N, 5.68; S, 12.25.

Example 3

Amounts of 50.0 g. of N-phenyl S-(2-chloropentyl)isothiocarbamyl chloride and 250 ml. of water were reacted as described in Example 1 to afford 30.0 g. of N-phenyl S-(2-chloropentyl)thiocarbamate, M.P. 71°–72° C.

*Analysis.*—Percent calcd. for $C_{12}H_{16}ClNOS$: C, 55.91; H, 6.26; N, 5.44; S, 12.41. Found: C, 56.04; H, 6.39; N, 5.75; S, 12.57.

Example 4

Amounts of 64.0 g. of N-phenyl S-(2-chlorooctyl)isothiocarbamyl chloride and 300 ml. of water were reacted as described in Example 1 for 5.5 hours at 80° C. The reaction mixture was cooled and extracted by ether. After drying over calcium chloride, the ether was evaporated and the residue extracted by cold pentane. This solution afforded, upon concentration, 53.0 g. (88% yield) of N-phenyl S-(2-chlorooctyl) thiocarbamate in the form of a yellow oil.

*Analysis.*—Percent for $C_{15}H_{22}ClNOS$: C, 60.07; H, 7.39; N, 4.69; S, 10.67. Found: C, 60.52; H, 7.37; N, 4.84; S, 11.00.

Example 5

Amounts of 26.8 g. N-(n-butyl) S-(2-chlorocyclohexyl) isothiocarbamyl chloride and 200 ml. of water were reacted as described in Example 4 to afford 22.6 g. (90.5%) of N-(n-butyl) S-(2-chlorocyclohexyl)thiocarbamate as a straw-colored oil.

*Analysis.*—Percent calcd. for $C_{11}H_{20}ClNOS$: C, 52.89; H, 8.07; Cl, 14.21; N, 5.61; S, 12.81. Found: C, 52.51; H, 7.99; Cl, 14.55; N, 5.21; S, 12.59.

Example 6

An amount of 40.0 g. of N-phenyl-S-(2-chloro-2-phenyl ethyl)isothiocarbamyl chloride was added to 200 ml. of water and boiled for one hour. The reaction mixture was cooled and extracted with ether. The ether solution was dried by calcium chloride, filtered and evaporated to afford a colorless oil which according to analysis by nuclear magnetic resonance- and mass-spectroscopy is a mixture composed of 3,4-diphenyl-1,3-thiazolidin-2-one and N-phenyl S-(2-chloro-2-phenyl ethyl)thiocarbamate.

What is claimed is:

1. A process for preparing a S-(2-chloroethyl)thiocarbamate which comprises reacting
   (a) a S-(2-chloroethyl)isothiocarbamyl chloride of the formula

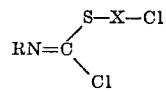

wherein R is selected from the class consisting of aryl having 6–8 carbon atoms, halogenated phenyl, nitrated phenyl, phenyl having a lower alkoxy substituent, cyclohexyl and alkyl having 1–18 carbon atoms; and wherein X is selected from the class consisting of alkylene having 2–18 carbon atoms, cycloalkylene having 5–12 carbon atoms, and alkylene having 2–3 carbon atoms and being substituted by a member of the group consisting of chlorine, bromine, phenyl, chlorophenyl, methoxyphenyl and lower alkoxy; and wherein the chlorine atom attached to X is separated from the sulfur atom by two methylene groups; with
   (b) water at a temperature of 0°–100° C. and isolating said thiocarbamate from said reaction mixture.

2. The process of claim 1 wherein R in said chloride reactant represents aryl having 6–8 carbon atoms and X represents alkylene having 2–18 carbon atoms.

3. The process of claim 1 wherein R in said chloride reactant represents aryl having 6–8 carbon atoms and X represents cycloalkylene having 5–12 carbon atoms.

4. The process of claim 1 wherein R in said chloride reactant represents alkyl having 1–18 carbon atoms and X represents cycloalkylene having 5–12 carbon atoms.

References Cited

UNITED STATES PATENTS 3,298,817  1/1967  Tilles et al. _____ 260—455 XR

OTHER REFERENCES

Wagner-Jauregg: "Hel. Chem. Acta.," vol. XII, pp. 377–385 (1958).

CHARLES B. PARKER, *Primary Examiner.*

D. R. PHILLIPS, *Assistant Examiner.*

U.S. Cl. X.R.

71—100; 260—306.7; 424—300